Aug. 28, 1945. H. L. CHISHOLM, JR 2,383,773
HYDRAULIC STEERING MOTOR AND SHIMMY DAMPENER
FOR AIRPLANE LANDING GEAR WHEELS
Filed July 2, 1942 4 Sheets-Sheet 1

Fig. 1.

Inventor
HARRY L. CHISHOLM, JR.

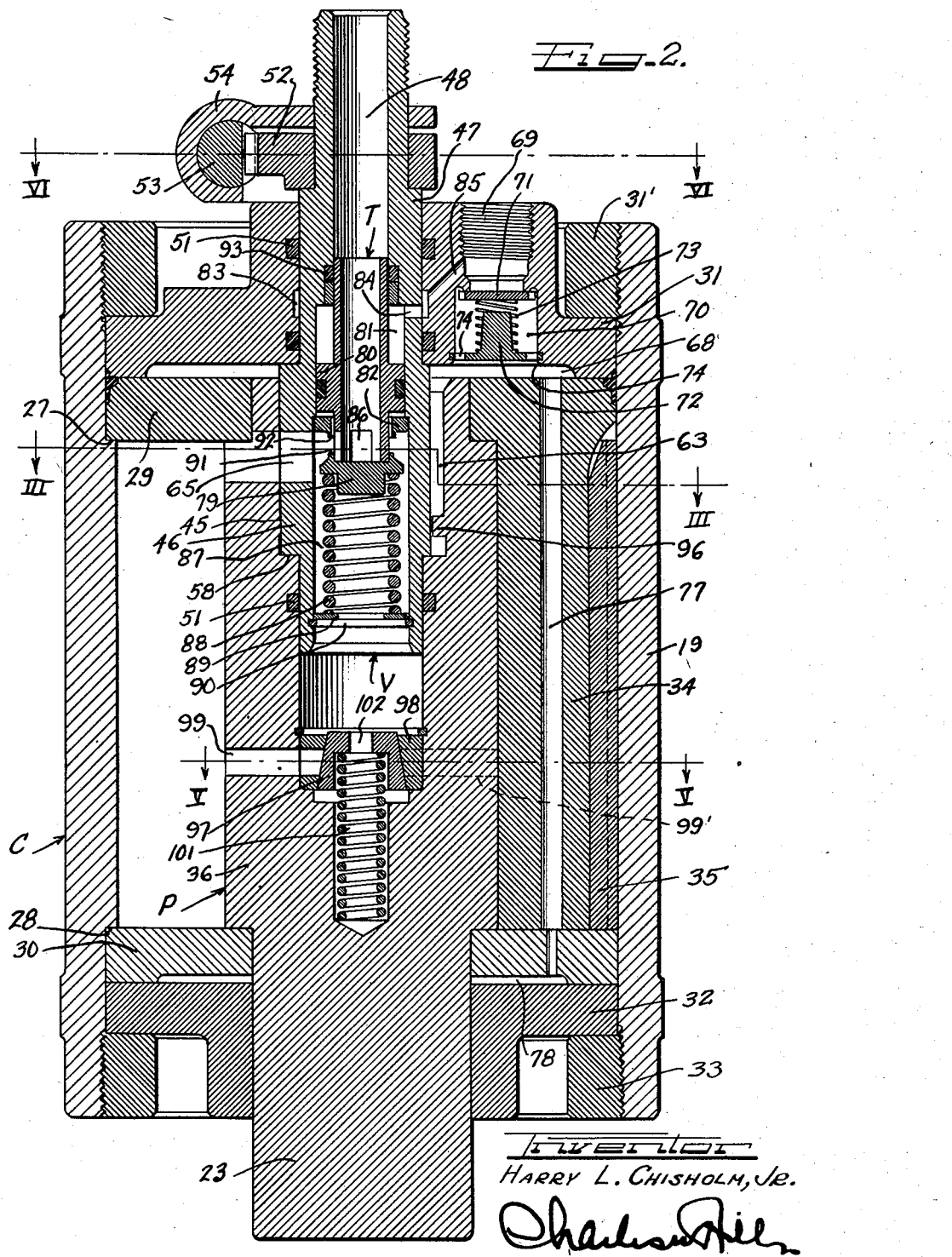

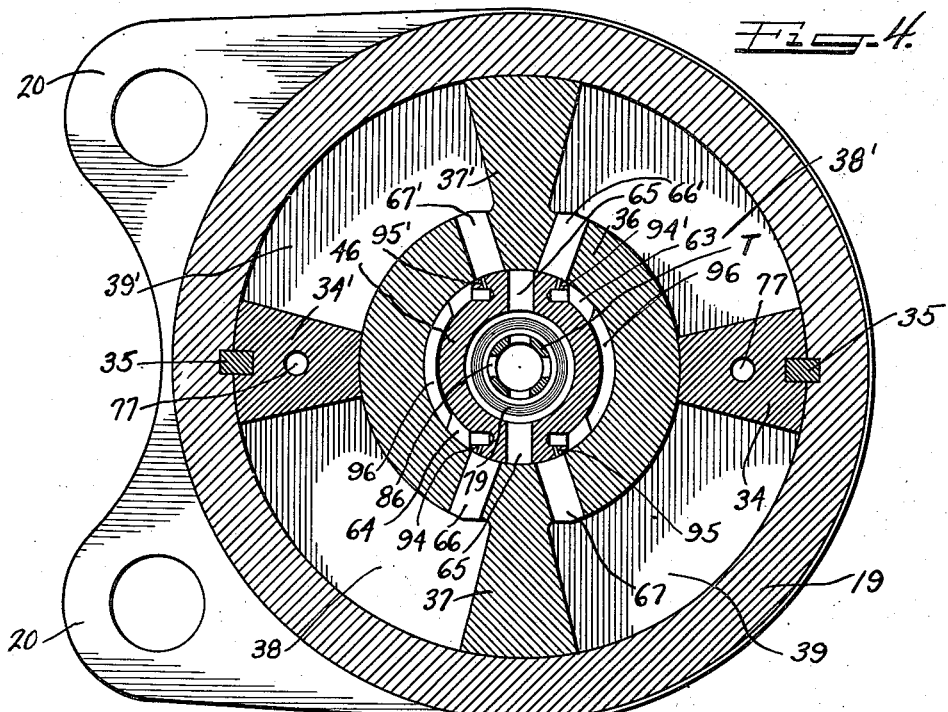
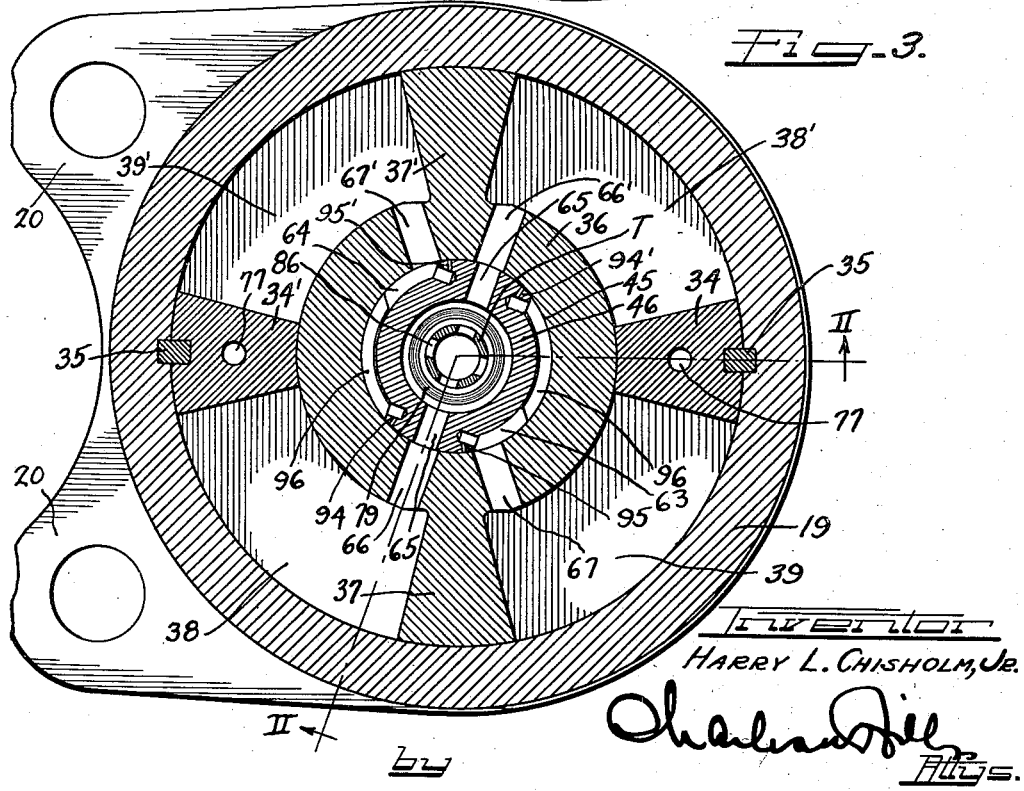

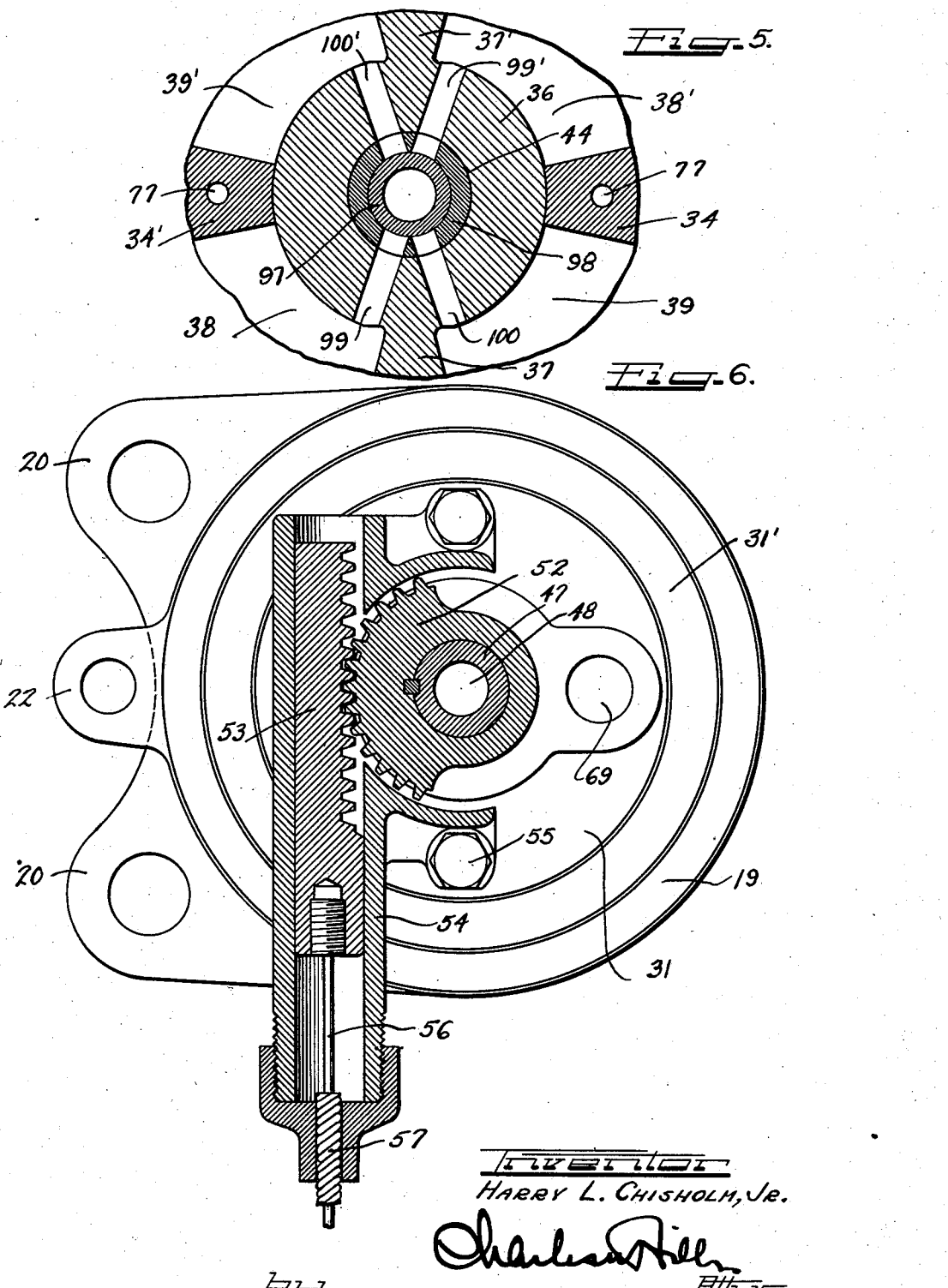

Patented Aug. 28, 1945

2,383,773

UNITED STATES PATENT OFFICE 2,383,773

HYDRAULIC STEERING MOTOR AND SHIMMY DAMPENER FOR AIRPLANE LANDING GEAR WHEELS

Harry L. Chisholm, Jr., Buffalo, N. Y., assignor to Houdaille-Hershey Corporation, Detroit, Mich., a corporation of Michigan Application July 2, 1942, Serial No. 449,382

11 Claims. (Cl. 244—100)

My invention relates to the steering and shimmy dampening of steering wheels on airplane landing gears, particularly the trailing or nose wheel of three-wheeled landing gears.

My invention covers various improvements over and additions to the steering motor and shimmy dampener disclosed in my pending application Serial No. 422,486, filed December 11, 1941.

In the device to which my invention is applied, the vaned piston operable in hydraulic working chambers is connected with the wheel to be steered and controlled, and a main valve, operable from the pilot seat in an airplane, controls the direction of flow of hydraulic fluid under pressure to the piston vanes for the desired direction of steering, valve ports and piston ports cooperating to check and block the flow between the working chambers so as to prevent shimmy of the wheels. Unless suitable safety means are provided to function in the event of breakage of the hydraulic supply line, or dropping of the line pressure below a safe and operating value, the device will not only cease to provide steering but will also become inoperative as a shimmy dampener. It is therefore an important object of my invention to provide automatic shut-off valve structure which, in case of hydraulic supply failure or unsafe hydraulic pressure, will function to enable the device to continue its effective shimmy dampening even though the device cannot then be operated for steering.

Another object is to provide automatic valve mechanism which, under normal operating conditions, is subjected to the hydraulic pressure to be held thereby in condition for normal functioning of the device for both steering and shimmy prevention but which, upon failure of the hydraulic supply pressure, will be set to effect closure of the hydraulic fluid inlet and the hydraulic fluid outlet of the device so that the fluid confined in the working chambers will be controlled to check and prevent shimmying, the displaced fluid then flowing from one pair of working chambers into the complementary pair through a predetermined resistance path.

Another important object is to provide replenishment passageways, preferably in the form of orifices, through which the working chambers may be kept filled with the hydraulic fluid under inlet pressure but which orifices become closed when the main valve structure is set for steering so that the steering may be with maximum hydraulic pressure.

My invention also embodies other features of construction, arrangement and operation, all of the features being embodied in the structure shown on the drawings, in which drawings:

Figure 1 is a side elevation of a steering wheel supporting structure and its connection with an airplane, and showing my improved hydraulic device applied thereto;

Figure 2 is a section on plane II—II Figure 3;

Figure 3 is a section on plane III—III Figure 2;

Figure 4 is a section like Figure 3 but showing the steering control valve in neutral position;

Figure 5 is a section on plane V—V Figure 2;

Figure 6 is a section on plane VI—VI Figure 2.

Referring to Figure 1, A indicates the body structure of an airplane from which extends an oleo strut O whose cylinder member 10 is hinged to the airplane body as indicated at 11 and whose plunger or piston element 12 terminates in a fork 13 journaling the wheel W to be controlled. The oleo strut is well known in the art, the cylinder 10 containing spring means or hydraulic fluid flow resisting means for dampening the movement of the piston or plunger element 12 for absorbing the shock of vertical movement of the wheel W. Lower and upper links 14 and 15 hinged together at their outer ends have their inner ends connected, respectively, to the fork 13 and to the ring 16 journaled on the cylinder 10 between the collars 17 and 18 secured to the cylinder.

The hydraulic controlling device for the wheel comprises a cylinder structure C, a piston structure P, and valve structure V. The cylindrical wall 19 of the cylinder structure has at its lower end ears 20 extending therefrom, and the collar 17 secured to the cylinder 10 of the oleo strut has ears 21 to which the ears 20 are secured by suitable bolts, an ear 22 being also provided at the upper end of the cylinder wall 19 for securing to the ear 22' on the cylinder 10.

The piston structure P has the shaft 23 extending downwardly out of the cylinder structure and an arm 24 secured to the end of the shaft has its outer end connected by a link 25 with the outer end of an arm 26 extending from the ring 16 which is rotatable on the oleo strut cylinder 10. The piston structure of the hydraulic device and the piston or plunger structure 12 of the oleo strut are thus connected to rotate together.

The wall 19 of the cylinder structure C has upper and lower internal shoulders 27 and 28 against which abut the cylinder end or closing walls 29 and 30, respectively. A bearing wall 31 fits in the upper end of the cylinder wall 19 and is engaged by a clamping ring 31' threading into the end of the cylinder wall. In the lower end of the cylinder wall 19 is the bearing wall 32 engaged by the clamping ring 33 threading into the lower end of the cylinder wall, the end walls 29 and 30 being thus securely clamped against the shoulders 27 and 28 to define with the cylinder wall 19 a cylinder space in which the piston structure P operates.

Extending radially from opposite sides of the cylinder wall 19 and between the end walls 29 and 30 are the abutment walls 34, 34' which may be integral with the end wall 29, keys 35 holding the abutment and the end wall against rotational displacement.

The piston structure P has the hub 36 from which the shaft 23 extends, the hub having vanes 37 and 37', the hub, the vanes, and the abutments 34, 34' defining hydraulic working chambers 38, 38' and 39, 39'. The piston shaft 23 is journaled at its lower end in the end wall 30 and in the bearing wall 32, and at its upper end the piston structure terminates in and is journaled by the end wall 29.

The piston hub has the bore 44 whose inner end is of increased diameter to provide a valve chamber 45. Into the shaft bore extends the valve structure V whose body 46 is operable in the valve chamber 45 and whose stem 47 extends upwardly through the bearing wall 31. The valve structure has the bore 48 extending therethrough which at its outer end communicates with a conduit or pipe 49 held to the end of the valve stem by a suitable coupling 50. Suitable packing 51 prevents leakage past the valve stem to the exterior of the hydraulic device.

At its outer end the valve stem carries a segmental gear 52 which is meshed by a rack 53 slidable in the housing 54 which, as best shown on Figure 6, may be secured to the bearing wall 31 by screws 55. A wire 55 extends through a protecting sheath 56 from the rack 53 to the cockpit of the airplane for manipulation to shift the rack for rotational setting of the valve structure V.

The valve V is held against axial displacement by the engagement of its body 46 with the bearing wall 31 and the shoulder 58 in the piston hub. The valve body is slabbed off on opposite sides to leave segmental passageways or ports 63 and 64, and extending diametrally through the valve head parallel with the slabbed sides is the port 65 which intersects and communicates with the valve bore 48. The hydraulic working chambers 38 and 38' are connected with the valve chamber by passageways 66 and 66' through the piston hub, while the working chambers 39 and 39' are connected with the valve chamber by passageways 67 and 67'. These passageways are so spaced that when the valve head is in its neutral position (Figure 4), the passageways will be shut off from the valve chamber and the valve port 65 will be closed by the piston hub walls. When the valve structure is rotated to a working position (Figure 3), the passageways for one set of working chambers will be connected with the valve chamber and the passageways for the other set of working chambers will be in comunication with the valve port 65. The bearing wall 31 is recessed in its underside to leave the space 68 between itself and the end wall 29, this space being at all times in communication with the segmental spaces or ports 63 and 64.

The bearing wall 31 has the inlet passageway 69 for communication with the valve chamber 70 in which is the disk valve 71 and the valve retainer 72. A spring 73 between the valve and the retainer tends to hold the valve seated to shut off the inlet passageway 69. Upon opening of the valve, fluid may flow downwardly through the passageways 74 in the retainer 72 and into the space 68 for flow into the valve ports 63 and 64. Referring to Figure 1, a supply pipe 75 is connected to the inlet 69 and receives hydraulic fluid under pressure from a source such as a pump S which may be a separate pump or may be the pump which supplies hydraulic pressure for operation of other controls on the airplane. The pump draws hydraulic fluid from a reservoir R to which the outlet or discharge pipe 49 from the hydraulic device extends. A suitable control valve 76 may be included in the supply pipe 75.

When the pressure of the fluid supplied by the pump is normal, the valve 71 will be opened by the pressure for flow of the fluid into the space 68 and to the valve ports 63 and 64. However, in case of breakage of the fluid supply line, or reduction in the pressure below a safe value, the spring 73 will close the valve 71 to shut off the inlet 69 from the hydraulic device. In order that the pressure against the outer sides of the end walls 29 and 30 may be kept balanced, the space 68 is connected through passageways 77 with the space 78 in the underside of the end wall 30, and these passageways 77 may extend through the abutments 34, 34'.

The outflow of fluid from the piston working chambers through the bore of the valve V is controlled by a piston structure T and a valve 79. The piston structure is tubular and has the guide flange 80 movable in the enlarged portion or space 81 of the valve bore 48 which space is closed at its lower end by a bushing 82 through which the piston extends with sufficient clearance for flow past the bushing when the piston moves. In the bearing wall 31 is the annular channel 83 which is connected with the space 81 by a passage 84 in the valve V and is connected with the fluid inlet 69 by a passageway 85 in the bearing wall 31. The lower end of the piston which projects through the bushing 82 is slotted to provide ports 86 for connection of the valve bore with the valve port 65.

The valve 79 is located in the lower enlarged portion 87 of the valve bore 48 for engagement with the lower end of the piston T, a spring 88 urging the valve 79 upwardly, the spring at its lower end being seated on a washer 89 held in place by a snap ring 90. The valve 79 has the seating flange 91 surrounding the lower end of the piston T which is engageable with the seating flange 92 on the bushing 82, the bushing being secured in the upper end of the space 87. When the hydraulic fluid supply is at normal pressure, the fluid will enter the space 81 behind the piston flange 80 by way of the passages 85 and 84, and this pressure will shift the piston T downwardly against the resistance of the spring 88 to hold the piston ports 86 in position below the bushing 82 for connection of the hydraulic device working chambers with the bore 48 of the valve V, and the device can then be utilized for hydraulic steering. However, should the pressure line be disrupted or the pressure fall to an unsafe value, the spring 88 will shift the valve 79 and the piston T upwardly for engagement of the valve seating flange 91 with the seating flange 92 on the bushing 82 so as to cut off flow through the piston ports 86 and prevent escape of hydraulic fluid flow from the working chambers. Suitable packing 93 is provided for the piston structure T to prevent leakage of fluid past the piston.

Referring to Figure 1, it is assumed that the plane is traveling toward the left, the wheel being in its neutral position, that is, position for straightforward travel of the plane on the ground. With this position of the wheel, the valve will be in its neutral position as shown on Figure 4, the valve port 65 being closed and the passageways between the hydraulic working chambers and the valve chamber 45 being shut off by the valve body, the passageway edges being slightly overlapped by the valve body so as to afford a seal against leakage. The hydraulic fluid in the working chambers will now be blocked against escape and the wheel will be hydraulically held in its neutral or straightforward position. Due to resilience in the piston shaft, the piston shaft lever, and the connecting linkage, a resonant shimmy of the wheel may occur, and in order to prevent straining of the parts, relief passageways are provided which, as shown on Figures 3 and 4, may be in the form of orifices 94 and 94' for connecting the valve ports 64 and 63, respectively, with the piston ports 66 and 66', and the orifices 95 and 95' for connecting the valve ports 63 and 64 respectively with the piston ports 67 and 67'. Resonant shimmy is usually of small magnitude and not sufficient to cause opening of the valve V, and the displaced fluid can readily flow through the orifices from one set of working chambers into the other. Should this shimmy increase sufficiently to move the piston structure relative to the valve V for connection of the valve port 65 with the piston ports, hydraulic fluid flow under pressure will immediately flow from the valve ports 63 and 64 into the exposed working chambers for shift of the piston for reclosure of the port 65 and the shimmy will thus be stopped.

If it is desired to steer the wheel W, the operator manipulates the wire 56 for shift of the rack 53 for rotation of the gear 52 and the valve V. Such setting of the valve in either direction from the neutral position will connect the valve ports 63 and 64 for flow of hydraulic fluid under pressure to the corresponding working chambers, and the valve port 65 will connect the other working chambers with the discharge circuit through the valve bore 48, the pressure against the piston vanes causing the piston structure and the wheel W to follow the movement of the valve. While the valve is in its neutral position relative to the piston structure, the orifices 94 and 95 will connect the valve ports 63 and 64 with the working chambers to keep these chambers filled with the fluid under high pressure. However, when the valve is set for steering, the orifices will be moved away from the piston ports and will be closed so that the full maximum fluid pressure may be available for moving the piston for steering of the wheel.

The rotational setting of the valve relative to the piston structure is limited in either direction from its neutral position to a distance which will bring the valve port 65 into full communication with either set of passageways through the piston structure to the working chambers. Such limitation is accomplished by stops 96 in the form of arcuate projections from the piston hub into the valve ports 63 and 64, these stops being engaged by the valve body at the limit of its setting movement in either direction (Figure 3). As long as the setting movement of the valve continues, the piston structure and the steering wheel will be hydraulically caused to follow the valve movement for the total available angular rotation of the piston structure in the cylinder structure of the hydraulic device. At the end of each setting movement of the valve, the follow up movement of the piston structure and wheel will effect closure of the various passageways through the working chamber and closure of the valve port 65 so that the hydraulic device will then function to hold the wheel in its set steering position and to dampen any shimmy movement thereof.

So long as the fluid flow in the supply line is maintained and fluid under sufficient safe pressure is delivered to the hydraulic device, the valve 71 will be held open and the piston structure T will be held down by the fluid pressure to hold the valve 79 open for exposure of the piston ports 86 for return flow of fluid from the hydraulic device to the reservoir R, and the hydraulic device may now function for steering and for shimmy dampening. However, in case of failure of fluid supply or drop in fluid pressure below a safe value, the valve 71 will be closed by its spring 73, and the spring 87 will shift the valve 79 and the piston structure T upwardly for closure by the valve 79 of the piston ports 86 to thus shut off outflow of hydraulic fluid from the working chambers. The hydraulic device then becomes a self-contained unit to function as a damper against shimmying, any movement of the piston structure by attempting shimmy movement being dampened by the flow of the displaced fluid from one pair of working chambers through the restricted orifices 94, 95 into the complementary pair of working chambers. As soon as the supply fluid under proper pressure is restored, the valve 71 will open and the piston structure T will be shifted for setting of the valve 79 for reopening of the piston ports 86.

To protect the hydraulic device against undue stress in its working parts when severe obstructions in the path of the steering wheel are encountered, a conical blow-off valve 97 is provided for cooperation with a seat 98 in the piston bore 44. Passageways 99, 99', which are in vertical alignment with the piston passageways 66 and 66', extend through the piston hub and the valve seat 98, and passages 100 and 100', which are in vertical alignment with the piston ports 67 and 67', extend through the piston hub and seat 98. A spring 101 tends to hold the valve 97 closed in order to disconnect the various passageways terminating at the valve seat. When the steering wheel, during landing of the plane or taxiing, encounters a severe obstruction tending to deflect the wheel, the corresponding movement of the piston structure will subject the fluid in the working chambers to such abnormal pressure that the fluid flow through the piston passageways, acting against the conical or inclined surface of the valve 97, will shift the valve axially so that the working chambers will be connected for direct free interflow of fluid until normal pressure conditions are resumed and the spring 101 snaps the valve shut. The valve is provided with a passageway 102 therethrough so that the pressure at opposite sides thereof is equalized for balanced operation of the valve.

I have shown a practical and efficient embodiment of the various features of my invention, but I do not desire to be limited to the exact structure, arrangement and operation shown and described as changes and modifications may be made without departing from the scope of my invention.

I claim as my invention:

1. A hydraulic power device for hydraulic steering of the steering wheel of an airplane landing gear comprising a cylinder mounted on the gear framework and a piston movable in the cylinder, said cylinder providing hydraulic working chambers in which the piston operates, connecting means for transmitting the movement of said piston to the steering wheel for steering movement thereof, a main valve in said device adjustable from the exterior thereof and a valve chamber for the valve, said valve having inflow and outflow ports, an inlet for flow of fluid under pressure to said inflow ports, a fluid outlet for outflow of fluid through said outlet ports, passageways in said piston structure between said valve chamber and said working chambers, said inlet and outlet ports being closed to said passageways when said valve is in a neutral position and setting of said valve in either direction from its neutral position connecting said ports with said passageways for flow of hydraulic fluid under pressure through said inlet ports into said working chambers at one side of the piston and outflow of fluid from said working chambers at the other side of the piston whereby said piston will be hydraulically moved for corresponding steering movement of the steering wheel, a check valve in said inlet passageway, a valving assembly in said outlet passageway, said check valve and said valving assembly being held in open position by the inflowing fluid when the pressure of the fluid is normal whereby said device may function for steering, means for closing said check valve and said valving assembly when the pressure of the supply fluid drops below a predetermined value whereby fluid will then be confined in said working chambers against outflow therefrom, and means effective only when said valve is in neutral position for providing restricted passageways between said working chambers for resisting the flow therebetween of the confined fluid to thereby dampen shimmying movement of the wheel and the piston structure.

2. A hydraulic power device for hydraulic steering of the steering wheel on an airplane landing gear and for preventing shimmy thereof, comprising a cylinder mounted on the gear framework and providing hydraulic working chambers, a piston movable in said working chambers and connecting means for transmitting the movement of the piston to the steering wheel for steering thereof, an inlet for flow of fluid under pressure to said working chambers, an outlet for outflow of fluid from said chambers, a setting valve operable from the exterior of the cylinder for controlling the direction of the fluid flow through said working chambers for the desired hydraulic movement of the piston and steering movement of the wheel, a spring pressed valve for said inlet and a spring pressed valve for said outlet tending to hold said inlet and outlet respectively closed, said inlet and outlet valves being subjected to the supply fluid when at normal pressure to be held open thereby for the flow of fluid through the working chambers under control of said setting valve for steering operation of said piston and wheel, said inlet and outlet valves closing upon cessation of fluid flow under sufficient pressure to hold said valves open whereby steering flow through said working chambers will be stopped, and flow resistance paths including restricted orifices in said setting valve for restricted interflow of the confined fluid between said working chambers whereby shimmy movement of the wheel will be dampened.

3. A hydraulic power device for hydraulic steering of the steering wheel on an airplane landing gear and for preventing shimmy thereof, comprising a cylinder mounted on the gear framework and providing hydraulic working chambers, a piston movable in said working chambers and connecting means for transmitting the movement of the piston to the steering wheel for steering thereof, an inlet for flow of fluid under pressure to said working chambers, an outlet for outflow of fluid from said chambers, a setting valve operable from the exterior of the cylinder for controlling the direction of the fluid flow through said working chambers for the desired hydraulic movement of the piston and steering movement of the wheel, a spring pressed valve for said inlet and a spring pressed valve for said outlet tending to hold said inlet and outlet respectively closed, said inlet and outlet valves being subjected to the supply fluid when at normal pressure to be held open thereby for the flow of fluid through the working chambers under control of said setting valve for steering operation of said piston and wheel, said inlet and outlet valves closing upon cessation of fluid flow under sufficient pressure to hold said valves open whereby steering flow through said working chambers will be stopped, and flow resistance paths including restricted orifices in said setting valve for restricted interflow of the confined fluid between said working chambers whereby shimmy movement of the wheel will be dampened, said resistance paths being closed when said inlet and outlet valves are open and said setting valve is operated for steering whereby the full pressure of the fluid will be effective for hydraulic steering movement of the piston and wheel.

4. A hydraulic device for the purpose described comprising a cylinder providing hydraulic working chambers, a piston operable in said chambers, an inlet and outlet for said chambers for the flow therethrough of fluid under pressure for moving said piston, a valve adjustable to control the direction of the fluid flow under pressure through said chambers for the desired direction of movement of said piston, means providing restricted flow passageways between said working chambers, said passageways being open for the flow of replenishing fluid to said chambers when said valve is in position to shut off flow through said chambers, and said passageways being closed when said valve is set for flow through said chambers whereby the full pressure of the fluid will then be available for piston movement, means for closing said inlet and said outlet upon failure of fluid supply to said chambers whereby the fluid in said chambers will be confined against escape, said restricted passageways then functioning to dampen the piston movement.

5. A hydraulic power device for hydraulic steering of the steering wheel on an airplane landing gear and for preventing shimmy thereof, comprising a cylinder mounted on the gear framework and providing hydraulic working chambers, a piston movable in said working chambers and connecting means for transmitting the movement of the piston to the steering wheel for steering thereof, an inlet for flow of fluid under pressure to said working chambers, an outlet for outflow of fluid from said chambers, a valve in said device and a valve chamber therefor, said valve having inflow and outflow ports, said inflow ports adapted to receive hydraulic fluid under pressure through said inlets, passageways in said piston structure between said valve chamber and said working chambers, said inlet and outlet ports being closed to said passageways when said valve is in a neutral position and setting of said valve at a predetermined distance in either direction for its neutral position connecting said ports with said passageways for flow of hydraulic fluid under pressure through said inlet ports to the working chambers at one side of the piston and outflow of fluid from the working chambers at the opposite side of the piston whereby said piston will be hydraulically moved for corresponding steering movement of the steering wheel, means providing restricted passageways open for the flow of replenishing fluid to said working chambers when said valve is in neutral position but being closed when said valve is moved to steering position whereby the full pressure of the fluid will be available for steering movement of the piston.

6. A hydraulic power device for hydraulic steering of the steering wheel on an airplane landing gear and for preventing shimmy thereof, comprising a cylinder mounted on the gear framework and providing hydraulic working chambers, a piston movable in said working chambers and connecting means for transmitting the movement of the piston to the steering wheel for steering thereof, an inlet for flow of fluid under pressure to said working chambers, an outlet for outflow of fluid from said chambers, a valve in said device and a valve chamber therefor, said valve having inflow and outflow ports, said inflow ports adapted to receive hydraulic fluid under pressure through said inlets, passageways in said piston structure between said valve chamber and said working chambers, said inlet and outlet ports being closed to said passageways when said valve is in a neutral position and setting of said valve at a predetermined distance in either direction for its neutral position connecting said ports with said passageways for flow of hydraulic fluid under pressure through said inlet ports to the working chambers at one side of the piston and outflow of fluid from the working chambers at the opposite side of the piston whereby said piston will be hydraulically moved for corresponding steering movement of the steering wheel, said valve having restricted orifices connecting the valve inlet ports with said passageways in the piston structure when said valve is in neutral position for replenishing fluid flow to the working chambers, said orifices being closed when said valve is set for steering whereby the full pressure of the fluid will be applied to the piston for steering movement thereof.

7. A hydraulic power device for hydraulic steering of the steering wheel on an airplane landing gear and for preventing shimmy thereof, comprising a cylinder mounted on the gear framework and providing hydraulic working chambers, a piston movable in said working chambers and connecting means for transmitting the movement of the piston to the steering wheel for steering thereof, an inlet for flow of fluid under pressure to said working chambers, an outlet for outflow of fluid from said chambers, a valve in said device and a valve chamber therefor, said valve having inflow and outflow ports, said inflow ports adapted to receive hydraulic fluid under pressure through said inlets, passageways in said piston structure between said valve chamber and said working chambers, said inlet and outlet ports being closed to said passageways when said valve is in a neutral position and setting of said valve at a predetermined distance in either direction for its neutral position connecting said ports with said passageways for flow of hydraulic fluid under pressure through said inlet ports to the working chambers at one side of the piston and outflow of fluid from the working chambers at the opposite side of the piston whereby said piston will be hydraulically moved for corresponding steering movement of the steering wheel, means providing restricted passageways open for the flow of replenishing fluid to said working chambers when said valve is in neutral position but being closed when said valve is moved to steering position whereby the full pressure of the fluid will be available for steering movement of the piston, valving means for said inlet and said outlet normally held open by the fluid pressure but automatically closed upon cessation of the fluid supply whereby the fluid will be confined in said working chambers against escape, said restricted passageways then functioning to dampen shimmy movement of the piston and steering wheel.

8. A hydraulic device for the purpose described comprising a cylinder providing hydraulic working chambers, a piston operable in said chambers, an inlet passageway for connection with a supply line for flow of fluid under pressure to said chambers, an outlet passageway for the outflow of fluid from said chambers, a main valve normally in neutral position to shut off said chambers from inlet and outlet flow but adjustable to control the direction of fluid flow under pressure through said chambers for the desired direction of movement of said piston, a check valve in said inlet passageway for preventing outflow therethrough, a control valve within said main valve, a piston within said main valve connected with said control valve and subjected to the pressure of the fluid from the supply line to be set thereby for holding said control valve open for flow through said outlet passageway, spring means for closing said control valve upon cessation of supply of fluid flow under sufficient pressure whereby fluid will then be confined in said working chambers against escape, and means providing restricted passageways between said working chambers for resisting the flow of the confined fluid between said chambers to thereby dampen piston movement, said restricted passageways being controlled by said main valve to be closed as soon as said main valve is moved from its neutral position.

9. A hydraulic power device for hydraulic steering of a wheel and prevention of shimmy thereof, comprising a cylinder providing hydraulic working chambers, a piston operable in said chamber and connected with the wheel to be steered, an inlet for the flow of hydraulic fluid under pressure to said working chambers for power operation of the piston for wheel steering thereby and an outlet for the fluid discharged from said chambers, a main valve normally in neutral position to shut off steering power flow through said chambers but being adjustable to control the direction of fluid flow through said chambers for the desired direction of steering movement by the piston, valving assemblies controlled by the inlet fluid pressure for respectively holding said inlet and said outlet open under normal inlet fluid pressure, means for closing said valving assemblies when the inlet fluid pressure flows below a predetermined value whereby the fluid in said working chambers will then be confined therein, and means controlled by said main valve when in neutral position for defining a resistance path for restricted flow of the confined fluid between working chambers during flow movement of the piston by the steering wheel whereby shimmy movement of the wheel will be dampened.

10. A hydraulic device for the purpose described comprising a cylinder providing hydraulic working chambers, a piston operable in said chambers, an inlet and an outlet for said chambers for flow therethrough of hydraulic fluid under pressure for moving said piston, a valve adjustable to control the direction of the fluid flow under pressure through said chambers for the desired direction of movement of said piston, passageways for restricted direct interflow between said working chambers, said passageways being open for such direct interflow only when said valve is in position to shut off pressure flow through said chambers, and said passageways being closed while said valve is open for pressure flow through said chambers for piston operation whereby the full pressure of the fluid will then be available for piston movement.

11. A hydraulic device for the purpose described comprising a cylinder providing hydraulic working chambers, a piston operable in said chambers, an inlet and an outlet for said chambers for the flow of hydraulic fluid therethrough under pressure for operation of the piston, a valve adjustable to control the direction of flow through said chambers for the desired direction of movement of said piston by said fluid, passageways for direct interflow between said working chambers including orifices in said valve for the flow of replenishing fluid to fill said chambers while said valve is closed against pressure flow through said chambers, said passageways being closed while the valve is open for fluid pressure for flow through said chambers for piston operation whereby the full pressure of the fluid will then be available for movement of said piston.

HARRY L. CHISHOLM, Jr.